(12) United States Patent
Takada et al.

(10) Patent No.: US 6,862,621 B2
(45) Date of Patent: Mar. 1, 2005

(54) FLOW CONTROLLING APPARATUS AND NODE APPARATUS

(75) Inventors: Syuji Takada, Kawasaki (JP); Yasuhiro Ooba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 771 days.

(21) Appl. No.: 09/902,843

(22) Filed: Jul. 11, 2001

(65) Prior Publication Data

US 2002/0089931 A1 Jul. 11, 2002

(30) Foreign Application Priority Data

Jan. 11, 2001 (JP) ...................................... 2001-003853

(51) Int. Cl.[7] ........................................... G06F 15/173
(52) U.S. Cl. ...................... 709/224; 709/223; 709/235; 709/236; 370/235; 370/236; 370/412
(58) Field of Search .................. 709/203, 223–224, 709/232–236; 370/230, 235, 236, 412

(56) References Cited

U.S. PATENT DOCUMENTS 5,694,390 A * 12/1997 Yamato et al. .............. 370/230
6,006,264 A * 12/1999 Colby et al. ................ 709/226
6,246,687 B1 * 6/2001 Siu ........................ 370/395.71

* cited by examiner

Primary Examiner—Jack B. Harvey
Assistant Examiner—Hieu C. Le
(74) Attorney, Agent, or Firm—Katten Muchin Zavis Rosenman

(57) ABSTRACT

The invention relates to a flow controlling apparatus provided in a node of a packet routing network, the flow controlling apparatus performing a rate-based congestion control on packets supplied via an incoming line as well as buffer management. The invention also relates to a node apparatus that incorporates such a flow controlling apparatus. In the flow controlling apparatus and the node apparatus, a frequency at which individual packets belonging to the flows are to be discarded during the course of buffer management are kept, for each flow, at approximately the same value. Therefore, in a network to which the invention is applied, the transmission quality is kept uniform and the service quality is highly maintained while flexible adaptation is made to various service forms.

17 Claims, 11 Drawing Sheets

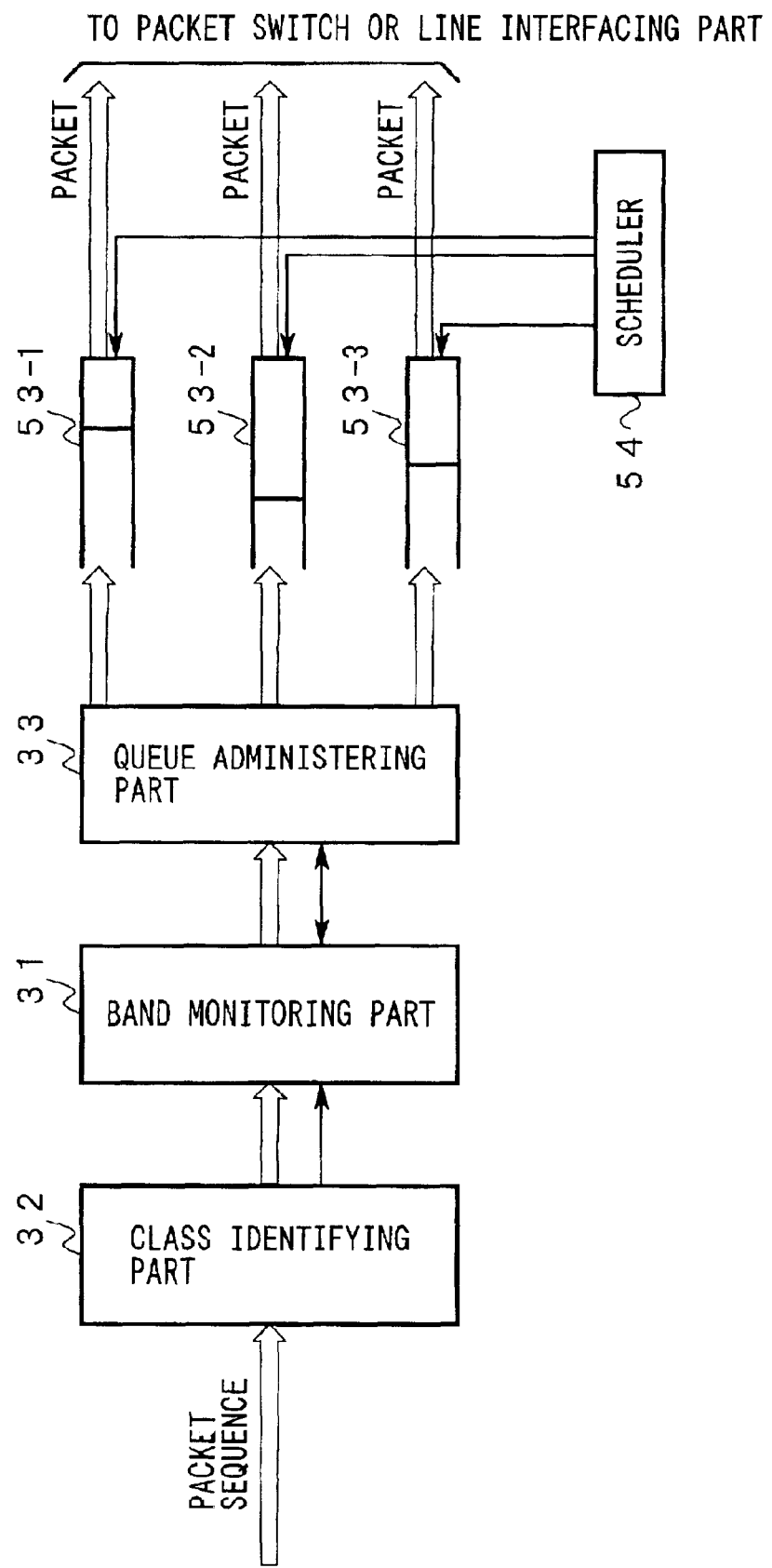

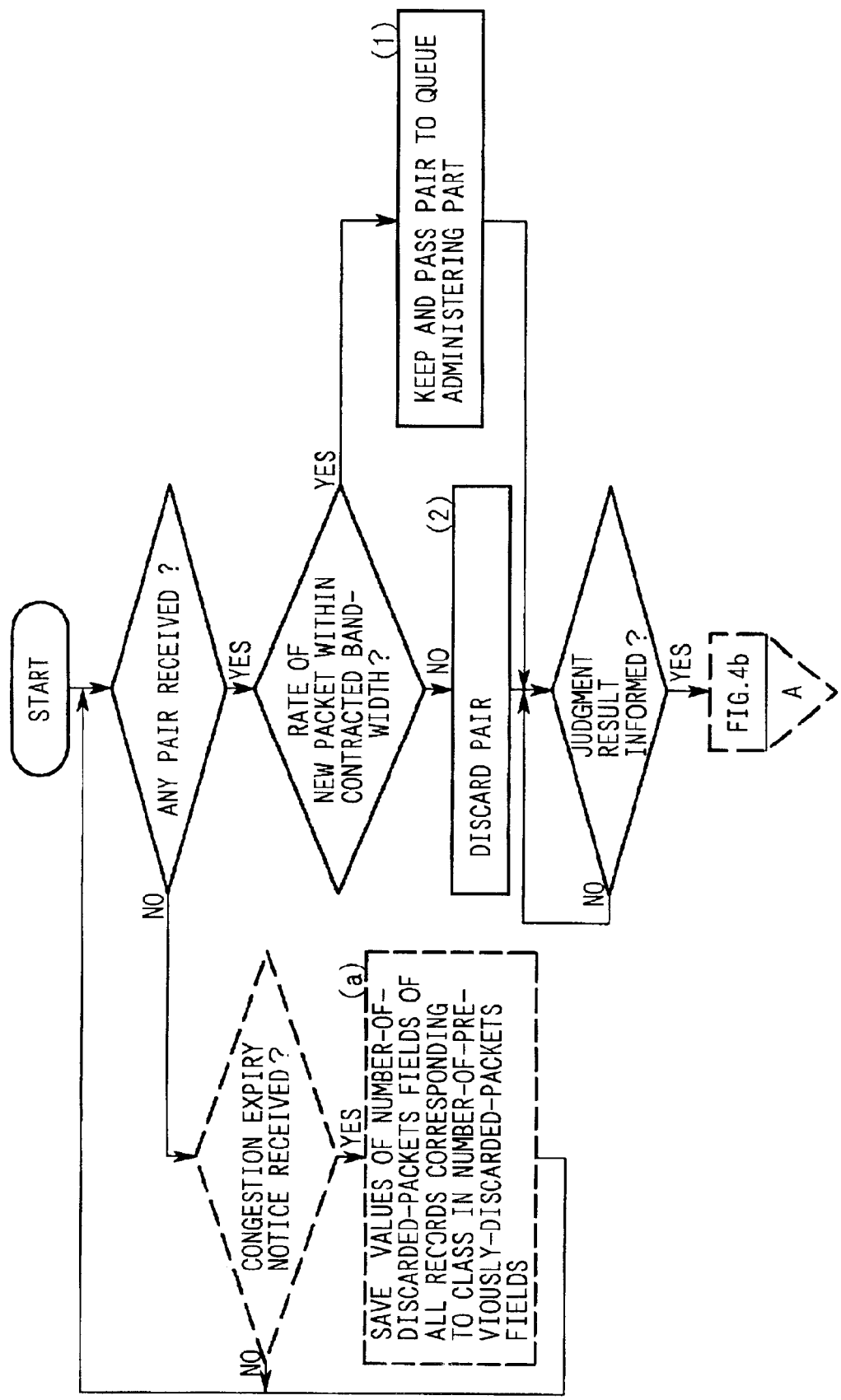

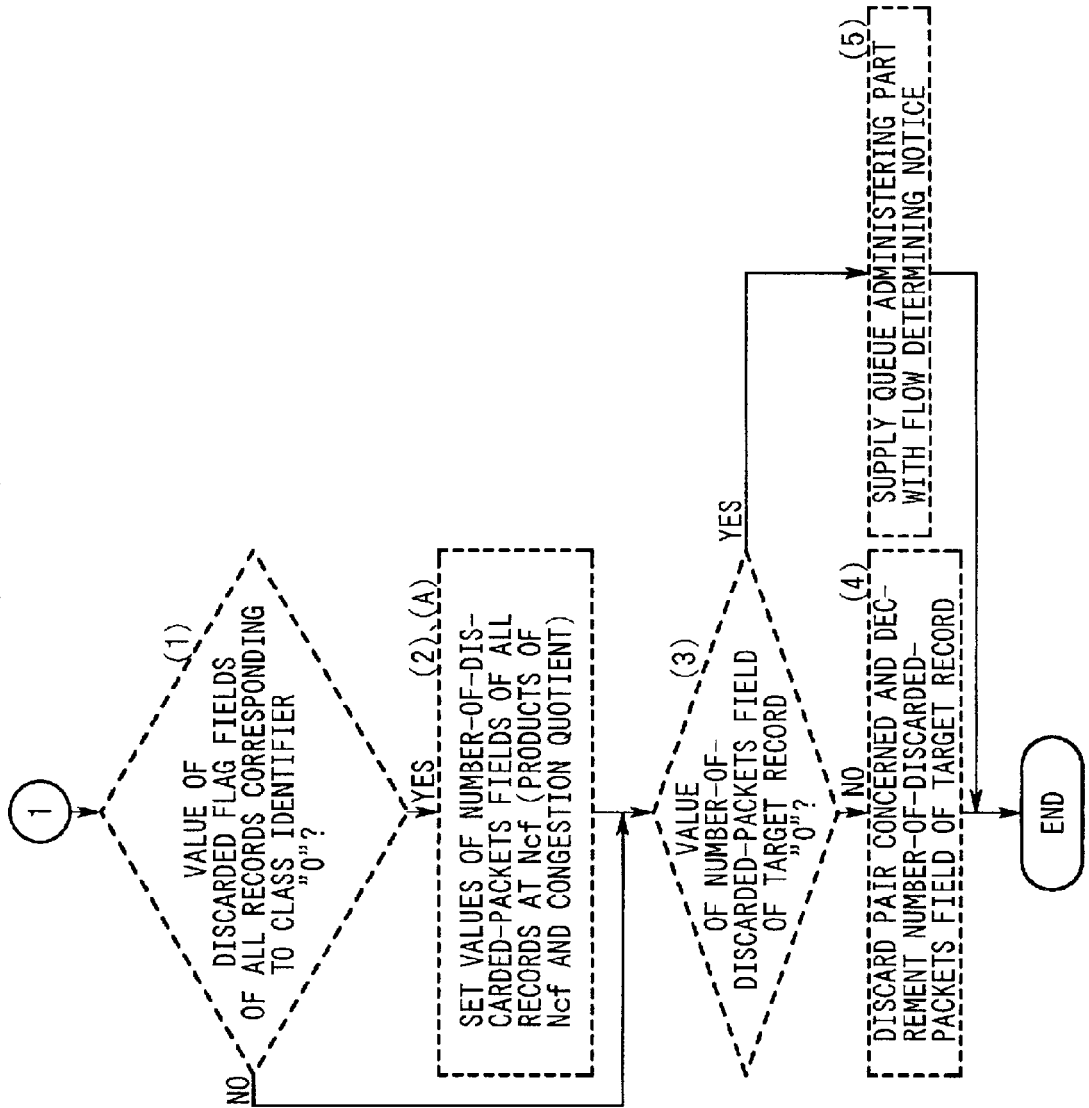

FIG. 8

| SERVICE CLASS | DESCRIPTION |
|---|---|
| DS(Delay Sensitive)CLASS | BOTH OF A TRANSMISSION BANDWIDTH AND A TRANSMISSION DELAY TIME ARE ASSURED BY DISCARDING PACKETS THAT ARE SUPPLIED AT A RATE OVER THE TRANSMISSION BANDWIDTH |
| TS(Throughput Sensitive)CLASS | A PRESCRIBED, MINIMUM TRANSMISSION BANDWIDTH IS ASSURED AND AN EXCESS BANDWIDTH IS ASSIGNED APPROPRIATELY |
| BE(Best Effort) CLASS | A SERVICE IS PROVIDED AS LONG AS AN EXCESS BANDWIDTH EXISTS AND NONE OF A TRANSMISSION BANDWIDTH, A TRANSMISSION DELAY TIME, AND TRANSMISSION QUALITY ARE ASSURED |

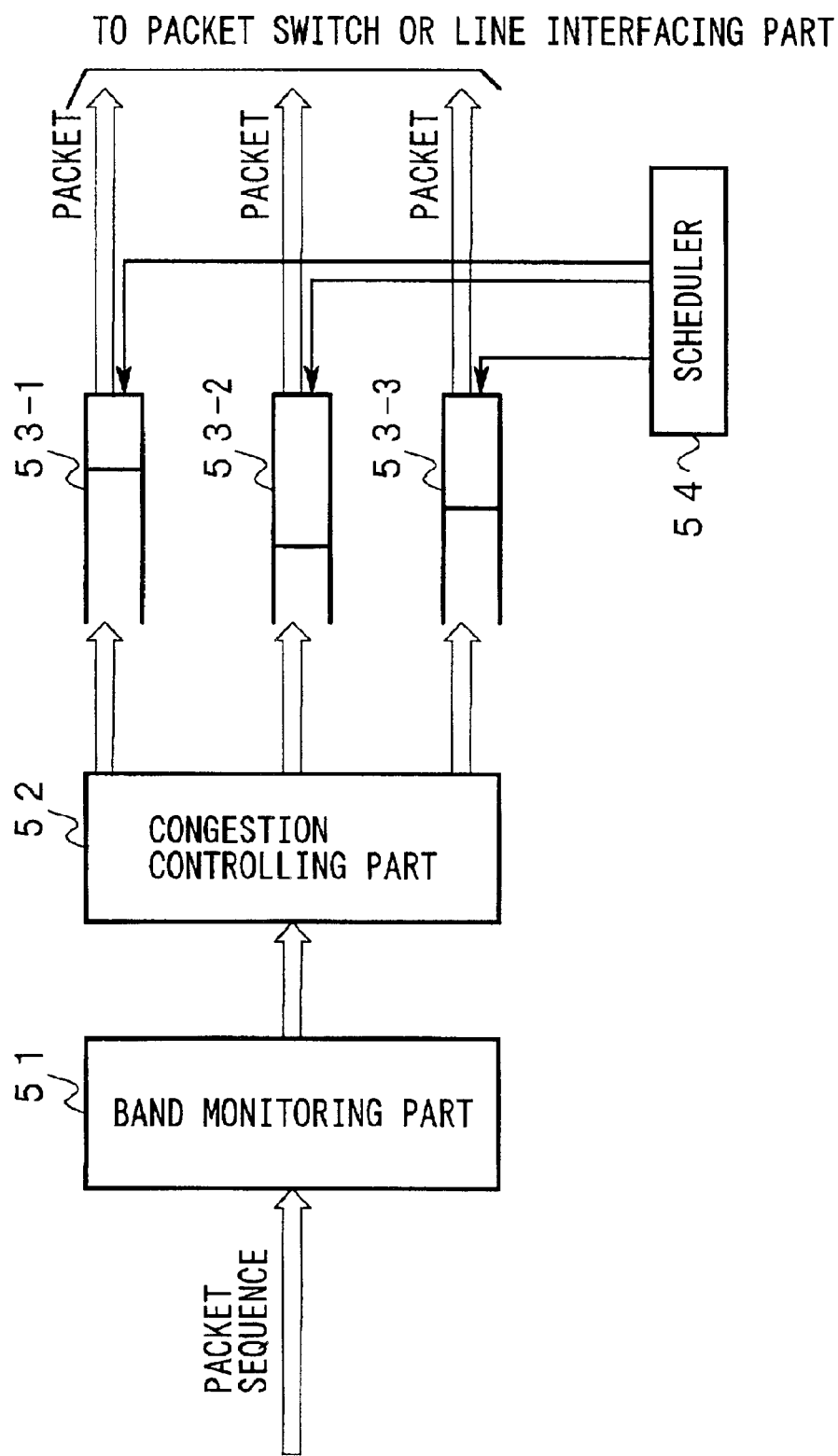

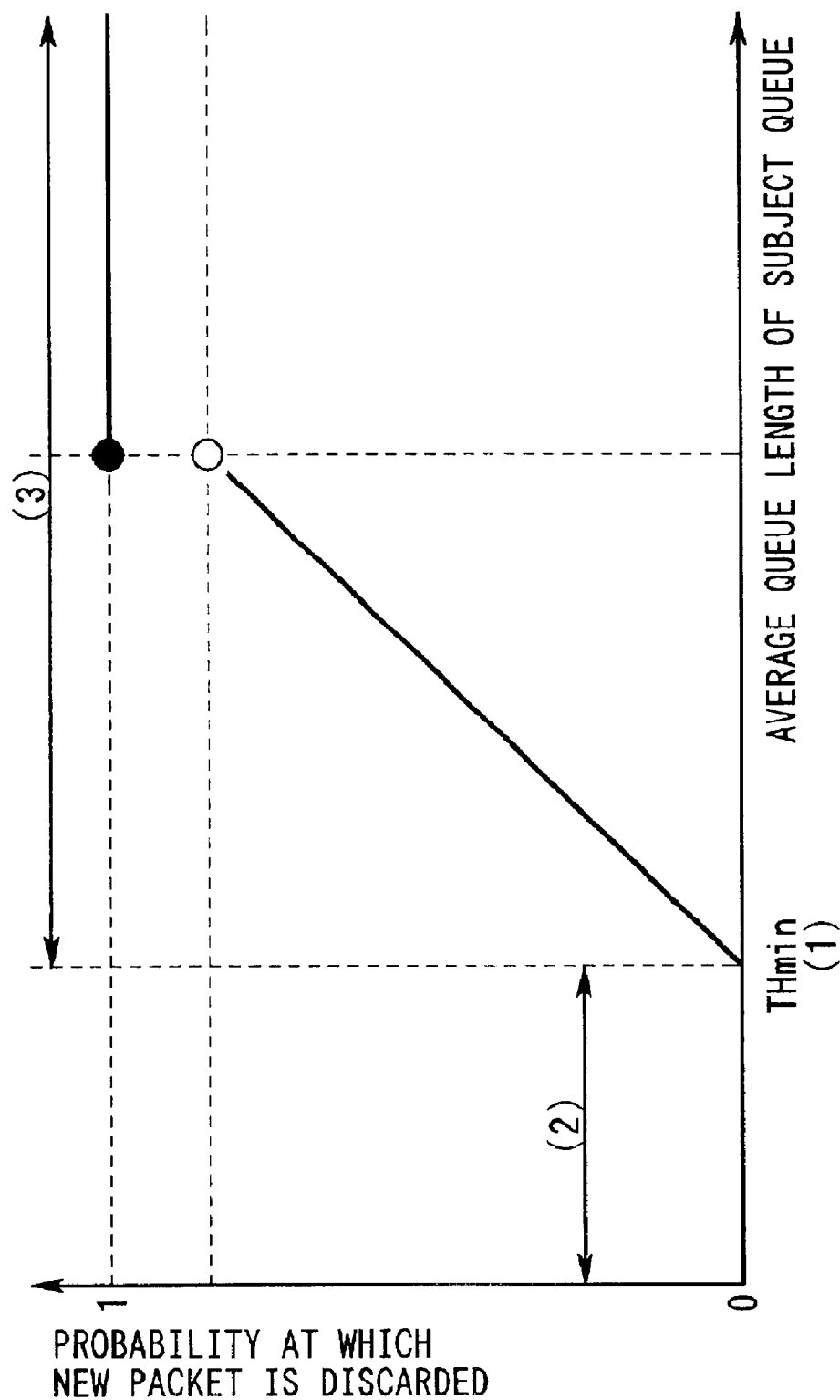

FLOW CONTROLLING APPARATUS AND NODE APPARATUS

BACKGROUND OF THE INVENTION

1. Field of the Invention

The present invention relates to a flow controlling apparatus provided in a node that accesses a packet routing network such as the Internet, the flow controlling apparatus performing a rate-based congestion control on packets that are supplied from a terminal accommodated in the node or via an incoming line as well as performing buffer management on buffers corresponding to the respective classes of such packets. The invention also relates to a node apparatus that incorporates such a flow controlling apparatus.

2. Description of the Related Art

In the Internet which has spread rapidly in recent years, best effort type services which do not assure any transmission delay time or transmission band are being provided to many users.

Further, in the Internet, attempts are being made positively to realize speech communication services using VoIP (voice over IP), for example, and to utilize the Internet as a virtual private networks (VPN).

Therefore, for example, techniques for assuring, end to end, the following service classes that conform to various service forms as shown in FIG. 8 are being applied to the Internet:

A DS (delay sensitive) type service class (hereinafter referred to merely as "DS class") in which both of a transmission bandwidth and a transmission delay time are assured by discarding packets that are supplied at a rate beyond the transmission bandwidth.

A TS (throughput sensitive) type service class (hereinafter referred to merely as "TS class") in which a prescribed, minimum transmission bandwidth is assured and an excess bandwidth is assigned as appropriate.

A BE (best effort) type service (hereinafter referred to merely as "BE class") in which a service is provided as long as an excess bandwidth exists and none of a transmission bandwidth, a transmission delay time, and transmission quality are assured.

FIG. 9 shows the configuration of an example apparatus that performs a flow control for the incoming line of a node.

As shown in FIG. 9, a sequence of packets that are sent from a terminal accommodated in the local station (or packets received from a preceding transmission section) is supplied to the input of a band monitoring part 51. The output of the band monitoring part 51 is directly connected to the input of a congestion controlling part 52. The congestion controlling part 52 has outputs corresponding to respective service classes (for simplicity, it is assumed here that they are the above-described DS (delay sensitive) type, TS (throughput sensitive) type, and BE (best effort) type service classes) to which the packets may belong. The outputs of the congestion controlling part 52 are directly connected to the inputs of queues 53-1 to 53-3 that correspond to the respective service classes. The outputs of the queues 53-1 to 53-3 are connected to respective ports of a packet switch (not shown; or a line interfacing part). The control terminals of a scheduler 54 that plays a leading role in reading (first-in first-out) of the queues 53-1 to 53-3 are directly connected to the read control terminals of the queues 53-1 to 53-3, respectively.

In the conventional example having the above configuration, the band monitoring part 51 is informed in advance of a transmission bandwidth (hereinafter referred to as "contracted bandwidth") that the user of the above-mentioned terminal, for example, requested at the time of contract. Every time receiving a packet (hereinafter referred to "new packet") from each terminal, the band monitoring part 51 performs a rate-based congestion control (mean policing) by performing the following series of operations:

(1) Identifies a flow (including the identifier of a sender) to which the new packet belongs by referring to a prescribed field of the new packet.

(2) Acquires a contracted bandwidth of the sender terminal.

(3) Judges, according to a prescribed algorithm such as the leaky bucket algorithm, whether the rate (average rate) of packets belonging to the identified flow exceeds the contracted bandwidth.

(4) Discards the new packet if the judgment result is true.

(5) Passes the new packet to the congestion controlling part 52 when the judgment result is false.

In a process of the above rate-based congestion control, in practice, the above judgment is done in consideration of not only the above-mentioned contracted bandwidth but also the statuses (including the degree of congestion) of the network and the destination of the new packet. However, those statuses are not important features of the invention, they will not be described in detail.

Every time receiving a new packet from the band monitoring part 51, the congestion controlling part 52 performs the following processing according to the RED (random early discard) algorithm or the WRD (weighted random early discard) algorithm:

(1) Identifies a service class to which the new packet belongs by referring to a prescribed field of the packet.

(2) Judges whether the amount of information (may be a queue length or an average value of queue lengths) of packets stored in the queue (hereinafter referred to as "subject queue") corresponding to the thus-identified service class among the queues 53-1 to 53-3 exceeds a prescribed upper limit value THmin (indicated by symbol (1) in FIG. 10).

(3) Stores the new packet in the subject queue according to first-in first-out (indicated by symbol (2) in FIG. 10) when the judgment result is false.

(4) Discards the new packet randomly at a probability that is higher when the amount of information is larger (indicated by symbol (3) in FIG. 10) when the judgment result is true.

The transmission bandwidth of the DS class and the minimum bandwidth of the TS class are bandwidths that should be assured within the sizes of the corresponding queues of the queues 53-1 to 53-3. Therefore, the service class of a packet that can be discarded by the congestion controlling part 52 during the course of the above processing is limited to the TS class and the BE class having an excess transmission bandwidth that can be allotted to the packet.

In a process that packets stored in advance in the queues 53-1 to 53-3 are read out under scheduling that is performed by the scheduler 54, prescribed processing is performed through cooperation between the scheduler 54 and the queues 53-1 to 53-3.

However, the procedure of such processing is not an important feature of the invention, it will not be described any further.

New packets are captured by the band monitoring part 51 within the contracted bandwidth. Then, the new packets are stored sequentially in the queue corresponding to the service class to which the packets belong among the queues 53-1 to 53-3 unless packets of an excessive amount of information (number) are stored in the queue, and read out sequentially under prescribed buffer management.

Therefore, in a node to which the conventional example is applied, occurrence of a deadlock is avoided under the above rate-based congestion control and buffer management, the flow control is performed stably, and the utilization efficiency of the network is kept high.

Incidentally, in the above conventional example, packets to be discarded by the congestion controlling part 52 are selected randomly according to the above-described algorithm and a flow to which each packet belongs is not identified during the course of the selection.

Therefore, in a period when many flows are formed by a sequence of packets belonging to one of the TS class and the BE class, the probabilities that packets belonging to the respective flows are discarded are not necessarily the same. Among packets belong to the same service class, packets belonging to a particular flow may be discarded at a higher probability than packets belonging to other flows.

SUMMARY OF THE INVENTION

An object of the present invention is to provide a flow controlling apparatus and a node apparatus in which packets belonging to flows are discarded fairly during the course of buffer management.

Another object of the invention is to keep the transmission quality proper and stable irrespective of a traffic distribution, the sizes of a queue and a packet, and the other configurations, as well as to increase the service quality and the total reliability of a transmission system to which the invention is applied.

Another object of the invention is to prevent a packet belonging to a particular flow from being discarded at a much higher frequency than a packet belonging to other flow, compared with a conventional art.

Another object of the invention is to reduce the cost and increase the reliability.

Another object of the invention is to prevent great deterioration in the transmission quality of a particular flow having a low rate compared with that of other flows, in contrast to a case where an excess transmission bandwidth is allotted uniformly to flows irrespective of their rates.

Another object of the invention is to reduce the running cost and increase the response speed.

Still another object of the invention is to prevent a great deterioration due to packet discard in transmission quality of a particular flow compared with that of other flows, even when the rates of each flow are very different from each other or may vary every moment.

Yet another object of the invention is to reduce the running cost and increase the response speed even when any of the queues is intermittently in a congestion state.

A further object of the invention is to recognize a time point when a congestion is resolved without an unnecessary delay, irrespective of a combination of the rates of flows.

Another object of the invention is to prevent needless acceleration of congestion and efficiently resolve a congestion in contrast to a case where the degree of congestion is not recognized at all in each queue.

Another object of the invention is to realize a flow control according to a desired form with high reliability and to secure a desired transmission capacity for each of flows and service classes.

Another object of the invention is to resolve a congestion without needlessly deteriorating transmission quality.

Another object of the invention is to resolve a congestion in a manner flexibly adapted to the degree of relaxation or acceleration of the congestion and the operating statuses of subsequent transmission sections etc. without needlessly deteriorating transmission quality.

Another object of the invention is to resolve or recognize a congestion without improperly discarding many packets belonging to a flow having a low transmission rate.

Still another object of the invention is to read out most of packets stored in a queue that is in a congestion state, with promptness and high reliability.

Yet another object of the invention is to prevent many new packets from being further stored in a queue that is in a congestion state and to unnecessarily accelerate the congestion.

A further object of the invention is to keep the transmission quality of each flow uniform and keep high service quality.

The invention provides a flow controlling apparatus in which new packets are discarded at a prescribed frequency in each flow of the new packets. The new packets are stored in a queue in which the amount of information in stored packets exceeds a prescribed value.

In the flow controlling apparatus, a packet to be subsequently stored in a queue that is in a congestion state is discarded at a predetermined frequency in each of the flows of the individual packets.

According to another aspect of the invention, there is provided a flow controlling apparatus in which: a section for adjusting a rate of each flow to a value lower than or equal to a prescribed upper limit value, is integral with a section for discarding new packets; and the section also includes a section for identifying flows to which the input packets individually belong.

In the flow controlling apparatus, it is possible to simplify and decrease the configuration since there is not redundantly provided a section for identifying a flow of a packet to be stored in a queue that is in a congestion state.

According to another aspect of the invention, the rate of a sequence of input packets is monitored for each of the flows. The packets are discarded in each flow at a frequency, which is an equivalent of a proportion of the monitored rates in each class to a total of the monitored rates in all the classes or, an equivalent of a proportion as an increasing function of the proportion of the monitored rate in each class.

In the flow controlling apparatus, an excess transmission bandwidth possibly secured within an excess region of the queue is allotted to flows in such a manner that a flow having a higher rate is given a larger proportion.

According to another aspect of the invention, a past result of packet discard is recorded for each flow. A new packet belonging to a flow having the past result is excluded from a subject of discarding, or a frequency at which the packet is discarded, is set at a low value.

In the flow controlling apparatus, a packet to be discarded for resolution of a congestion is simply identified for each flow without integration of the number or amount of information in a previously discarded packet, irrespective of the flow of the packet.

According to another aspect of the invention, the number of times packet(s) is/are discarded is counted for each flow. A new packet, which belongs to a flow where a packet is discarded a number of times greater than or equal to a prescribed value, is excluded from a subject of discarding, or a frequency at which the packet is discarded, is set at a low value.

In the flow controlling apparatus, a packet to be discarded for resolution of a congestion is identified in each flow with high reliability even when a packet in a certain flow is discarded plural times for the resolution.

According to still another aspect of the invention, a past result of packet discard is kept in relation to the flow of the packet and a past result of the corresponding flow. A packet to be stored in a queue, in which the amount of information in a previously stored packet exceeds a prescribed threshold value, is excluded from a subject of discarding or a frequency at which the packet is discarded, is set at a low value.

In the flow controlling apparatus, the past result is effectively recognized even when a queue corresponding to the class of a discarded packet, goes into a congestion state again after recovery from a previous congestion state.

According to yet another aspect of the invention, the number of times packet(s) is/are discarded is kept corresponding to the flow where the packet belongs. A packet belonging to a flow where packet(s) is/are discarded a number of times greater than a predetermined value and is to be stored in a queue, in which the amount of information in a previously stored packet exceeds a prescribed threshold, is excluded from a subject of discarding, or a frequency at which the packet is discarded, is set at a low value.

In the flow controlling apparatus, the number of times packet(s) is/are discarded is recognized effectively even when a queue corresponding to the class of a packet, which is previously discarded and equal to the above number of times, goes into a congestion state again after recovery from a previous congestion state.

According to a further aspect of the invention, the number of times packet(s) is/are discarded is kept, whose importance of the kept data is weighted lighter as time elapses and the kept number corresponds to a flow to which the packet belongs. A packet, of a flow whose number of times packet (s) is/are discarded kept, and is to be stored in a queue in which the amount of information in a previously stored packet exceeds a prescribed threshold, is excluded from a subject of discarding, or a frequency at which the packet is discarded, is set at a low value.

The flow controlling apparatus makes it possible to prevent a long delay in discarding a packet belonging to a specific flow, whose rate is considerably lower than that of other flows, in spite that a desired number of packets of the service classes corresponding to most of the queues, which are in a congestion state, are discarded in every flow.

According to another aspect of the invention, a degrees in which the amount of information in packets stored in the respective queues exceeds the prescribed threshold value is identified. New packets to be stored in the queue are discarded at a frequency which is higher, the higher the identified degree is.

In the flow controlling apparatus, in any of the queues, the higher the degree of congestion is, the larger the proportion of discarding new packets to be subsequently written, becomes.

According to another aspect of the invention, a maximum value conforming to the classes respectively corresponding to the queues, is given in advance. New packets of the classes are discarded at a frequency lower than or equal to the maximum values.

In the flow controlling apparatus, a minimum transmission bandwidth to be secured for each class can be secured as long as the above maximum value is set at a proper value.

According to another aspect of the invention, a number, which is the maximum of the number of new packets allowed to be discarded is given in advance for every flow and the packets are in a range of transmission bandwidth to be secured. A new packet, subsequent to new packets of a maximum number, is not discarded after the maximum number of new packets are discarded.

In the flow controlling apparatus, it is possible to prevent a large number of packets from being discarded for resolution of a congestion in spite that the maximum transmission bandwidth to be actually secured for each class is narrow.

According to another aspect of the invention, a maximum transmission bandwidth to be secured for each class is recognized. A number, which is the maximum of the number of new packets allowed to be discarded, is given for each flow. The packets are in a range of the recognized transmission bandwidth. A new packet, subsequent to new packets of a number equal to or greater than the maximum number, are not discarded after the number greater than or equal to the maximum number of new packets are discarded.

The flow controlling apparatus makes it possible to prevent an excessively large number of packets from being discarded for resolution of a congestion during a period when the maximum transmission bandwidth to be actually secured for each class is narrow, even in a case where the maximum transmission bandwidth may vary widely.

According to another aspect of the invention, given in advance is a reference value conforming to a transmission bandwidth to be secured for a class corresponding to a queue. The reference value is given for each flow where packets belong. The packets are to be stored in a queue in which the amount of information in previously stored packets exceeds the prescribed threshold value. New packets are not subsequently discarded after a difference or a ratio between a sum of the numbers or amount of information in packets that are previously discarded and are not discarded becomes greater than or equal to the reference value.

In the flow controlling apparatus, in any of the queues, the lower the transmission rate to be attained in each flow is, the smaller value the number of discarded packets for resolution of a congestion is set at.

According to still another aspect of the invention, new packets belonging to a corresponding flow are discarded at a frequency that is lower in order of time-series.

In the flow controlling apparatus, even when a queue takes a long time to recover from a congestion state, an increase in the number of packets subsequently stored in the queue is prevented.

According to yet another aspect of the invention, when a dispersion of a proportion is smaller than a predetermined threshold value, new packets individually belonging to all the flows are discarded at a frequency, which is higher, the larger the proportion is. The proportion is the number of discarded packets in each class to the total number of discarded packets in all the classes and the classes respectively correspond to queues which are in a congestion state.

In the flow controlling apparatus, when most of packets needed to be discarded are discarded without being stored in a queue in a congestion state, packets belonging to all the flows temporarily become subjects of discarding while the number of packets to be subsequently discarded for each flow is effectively passed over.

According to a further aspect of the invention, there is provided a node apparatus to which any of the above-described flow controlling apparatuses is applied.

In the node apparatus, the transmission quality of the flows are kept uniform and hence the service quality is highly maintained.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3 shows first to eighth embodiments of the invention;

FIGS. 4a and 4b is an operation flow chart of a band monitoring part of the first to fifth embodiments of the invention;

FIG. 7 is an operation flowchart of a band monitoring part of the second and fourth embodiment of the invention;

FIG. 8 is a table showing examples of service classes to be assured in the Internet;

FIG. 9 shows the configuration of an example apparatus that performs a flow control for the incoming line of a node; and FIG. 10 is a graph showing an example relationship between the probability of packet discard and the length of a subject queue.

DESCRIPTION OF THE PREFERRED EMBODIMENTS

First, the principles of flow controlling apparatuses according to the present invention will be described with reference to FIG. 1.

Figure 1:
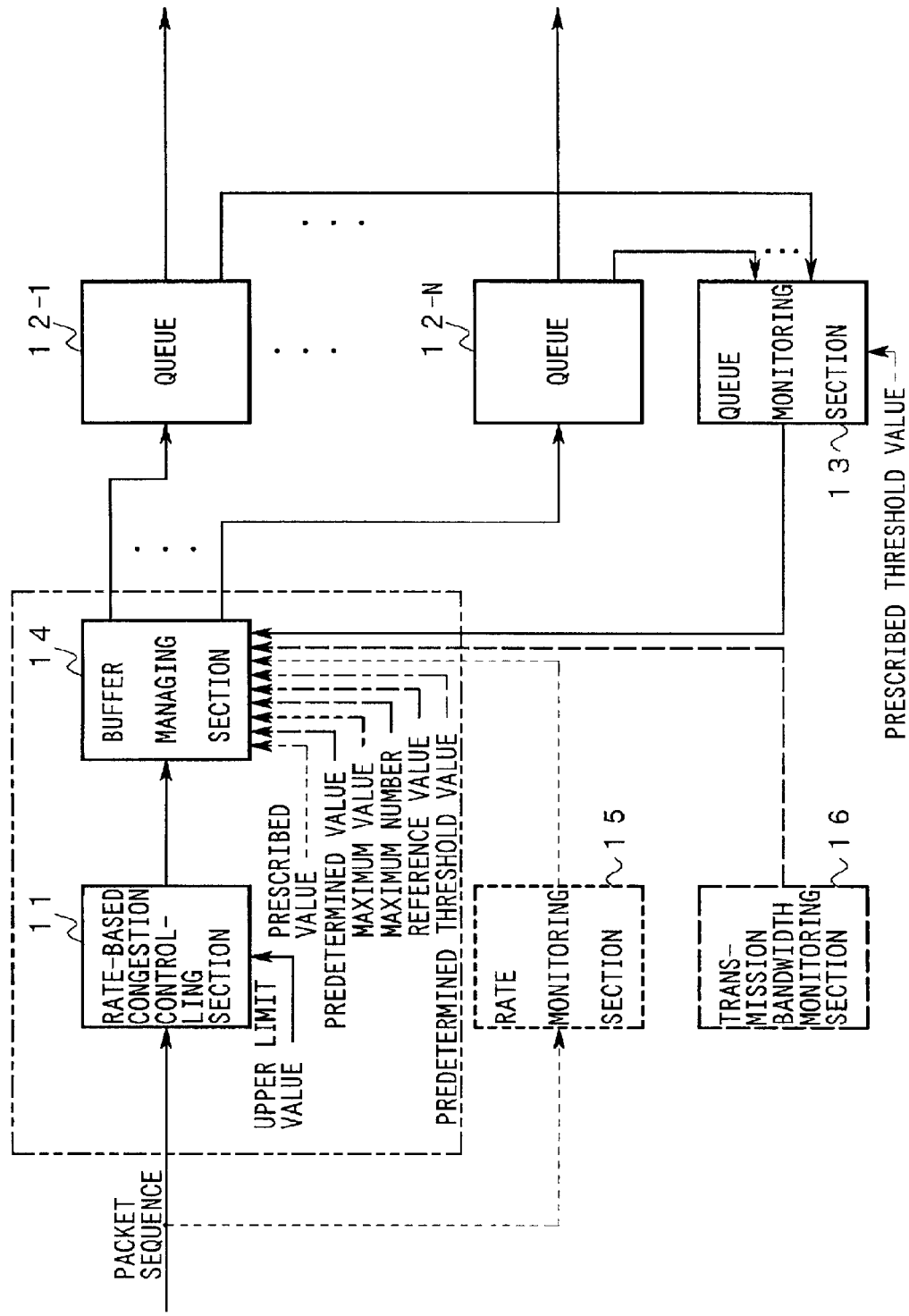
FIG. 1 is a block diagram showing the principles of flow controlling apparatuses according to the invention.

FIG. 1 is a block diagram showing the principles of flow controlling apparatuses according to the invention. Each flow controlling apparatus shown in FIG. 1 is composed of a rate-based congestion controlling section 11, queues 12-1 to 12-N, a queue monitoring part 13, a buffer managing section 14, a rate monitoring section 15, and a transmission bandwidth monitoring section 16 (each apparatus does not necessarily include all the parts and sections).

The principle of a first flow controlling apparatus according to the invention is as follows.

The rate-based congestion controlling section 11 adjusts, for each of flows to which the sequence of an input packets belong individually, a rate of the packets to a value lower than or equal to a prescribed upper limit value. The queues 12-1 to 12-N provided corresponding to classes to which the input packets may belong, are used for storing and sending packets of the classes according to first-in first-out. The queue monitoring section 13 identifies, from the queues 12-1 to 12-N, a queue in which the amount of information in packets stored exceeds a prescribed threshold value. The buffer managing section 14 discards new packets at a predetermined frequency for each of flows, the new packets whose rate is adjusted by the rate-based congestion controlling section 11 and being to be stored in the queue identified by the queue monitoring section 13.

In the flow controlling apparatus, a packets to be subsequently stored in a queue, which is in a congestion state due to storage of packets whose amount of information exceeds the above threshold value, is discarded at the above frequency in each of the flows of the individual packets.

Therefore, in contrast to the conventional example in which storage in a queue concerned is avoided to resolve such a congestion and a packet to be discarded is selected irrespective of flows of the packet, a packet belonging to a particular flow is discarded at a much higher frequency than a packet belonging to other flow can be prevented.

The principle of a second flow controlling apparatus according to the invention is as follows.

The buffer managing section 14 for identifying flows to which individual input packets belong, comprises a section which is integral with/provided in the rate-based congestion controlling section 11.

In the flow controlling apparatus, it is possible to simplify and decrease the configuration since there is not redundantly provided a section for identifying a flow of a packet to be stored in a queue that is in a congestion state. Therefore, the cost is reduced and the reliability is increased.

The principle of a third flow controlling apparatus according to the invention is as follows.

The rate monitoring section 15 monitors the rate of input packets for each of the flows. The buffer managing section 14 stores rate-adjusted packets by the rate-based congestion controlling section 11 in the queues 12-1 to 12-N corresponding to the classes of the rate-adjusted packets at a frequency which is an equivalent of a proportion of the monitored rate in each class to a total of the monitored rates in all the classes, or an equivalent of a proportion as an increasing function of the proportion of the monitored rate in each class.

In the flow controlling apparatus, an excess transmission bandwidth possibly secured within an excess region of the queue is allotted to flows in such a manner that a flow having a higher rate is given a larger proportion.

Therefore, in contrast to a case where such an excess transmission bandwidth is allotted uniformly to flows irrespective of their rates, an event that the transmission quality of a particular flow having a low rate is substantially lowered than that of other flows can be prevented.

The principle of a fourth flow controlling apparatus according to the invention is as follows.

The buffer managing section 14 records a past result of packet discard for each flow; and excludes a new packet belonging to a flow having the past result from a subject of discarding, or discards the new packet at a lower frequency than a new packet belonging to a flow not having a past result.

In the flow controlling apparatus, a packet to be discarded for resolution of a congestion state is simply identified for each flow without integration of the number or amount of information in a previously discarded packet, irrespective of the flow of the packet.

Therefore, the processing procedure performed by the buffer managing section 14 is simplified, the running cost is reduced, and the response speed is increased.

The principle of a fifth flow controlling apparatus according to the invention is as follows.

The buffer managing section 14 counts the number of times packet(s) is/are discarded for each flow; and excludes, from a subject of discarding, a new packet of a flow where packet(s) is/are discarded a number of times greater than equal to a prescribed value, or discards the new packet of the flow at a lower frequency than a frequency at which a new packet of a flow where packet(s) is/are discarded a number of times smaller than or equal to a prescribed value.

In the flow controlling apparatus, a packet, which is not subsequently stored in a queue in a congestion and is discarded for resolution of the congestion is identified in each flow with high reliability even when a packet in a certain flow is discarded plural times for the resolution.

Therefore, even when the rates of each flow are greatly different from each other or may vary every moment, an event that the transmission quality of a particular flow is substantially lowered than that of other flows due to packet discard can be prevented.

The principle of a sixth flow controlling apparatus according to the invention is as follows.

The buffer managing section 14 keeps a past result of packet discard for every flow to which the discarded packets belong; and excludes, from a subject of discarding, a packet to be stored in the queue identified by the queue monitoring section 13, or discards the packet at a lower frequency than a frequency at which a packet belonging to a flow not having a past result is to be discarded.

In the flow controlling apparatus, the past result is effectively identified by the buffer managing section 14 even when a queue corresponding to the class of a discarded packet, goes into a congestion state after a recovery from a previous congestion state.

Therefore, even where one of the queues 11-1 to 11-N is intermittently in a congestion state, it is possible to simplify the processing procedure performed by the buffer managing section 14, reduce the running cost, and improve the response speed as in the fourth flow controlling apparatus.

The principle of a seventh flow controlling apparatus according to the invention is as follows.

The buffer managing section 14 keeps the number of times packet(s) is/are discarded for every flow; and excludes, from a subject of discarding, a packet which belongs to a flow where packet(s) is/are discarded a number of times greater than a predetermined value and is to be stored in the queue identified by the queue monitoring section 13, or discards the packet to be stored at a lower frequency than a frequency at which a packet belonging to a flow where packet(s) is/are discarded a number of times smaller than the predetermined value, is to be discarded.

In the flow controlling apparatus, the number of times kept in the buffer managing section 14 is effectively identified by the buffer managing section 14 even when one of the queues 11-1 to 11-N corresponding to the class of a packet, which is previously discarded and equal to the above number of times, goes into a congestion state again after recovery from a previous congestion state.

Therefore, even where any one of the queues 11-1 to 11-N intermittently is in a congestion state, the processing procedure performed by the buffer managing section 14 is simplified, the running cost is reduced, and the response speed is increased as in the above fifth flow controlling apparatus.

The principle of an eighth flow controlling apparatus according to the invention is as follows.

A number of times packet(s) is/are discarded is kept, whose importance of kept data is weighed lighter as time elapses. The buffer managing section 14 keeps the number of times corresponding to a flow to which the packet belongs. The buffer managing section 14 excludes, from a subject of discarding, a packet of a flow whose number of times packet(s) is/are discarded is kept, and is to be stored in the queue identified by the queue monitoring section 13, or discards the packet to be stored at a frequency which is lower, the smaller the number of times said packet is discarded becomes.

The flow controlling apparatus makes it possible to prevent a excessively long delay in discarding a packet belonging to a specific flow, whose rate is considerably lower than that of other flows, in spite that a desired number of packets of the service classes corresponding to most of the queues, which are in a congestion state, are discarded in every flow.

Therefore, a time point when a congestion is resolved is effectively identified without an undue delay, irrespective of combination of the rates of each flow.

The principle of a ninth flow controlling apparatus according to the invention will be described below.

The queue monitoring section 13 identifies a degree in which the amount of information in packets stored in the queues 12-1 to 12-N exceeds the prescribed threshold value. The buffer managing section 14 discards new packets to be stored in a queue at a frequency which is higher, the higher the identified degree is.

In the flow controlling apparatus, in any of the queues 12-1 to 12-N, the higher the degree of congestion becomes, the larger the proportion of packets which are discarded without being subsequently written is.

Therefore, compared with a case where the degree of congestion is not identified at all for each queue, undue acceleration of congestion is prevented and a congestion is efficiently resolved.

The principle of a tenth controlling apparatus according to the invention is as follows.

The buffer managing section 14 is given in advance a maximum value conforming to the classes respectively corresponding to the queues 12-1 to 12-N, and discards new packets of the classes at a frequency lower than or equal to the maximum value.

In the flow controlling apparatus, a minimum transmission bandwidth to be secured for each class can be secured as long as the above maximum value is set at a proper value.

Therefore, a flow control according to a desired form is realized with high reliability, and a transmission capacity to be attained for each of flows and service classes are secured during the course of the flow control.

The principle of an eleventh flow controlling apparatus according to the invention is as follows.

The buffer managing section 14 is given in advance a number which is the maximum of the number of allowed to be discarded. The maximum number conforms to a transmission bandwidth to be secured for each class to which input packets can belong. The buffer managing section 14 refrains from discarding a new packet, subsequent to new packets of a maximum number, after the maximum number of new packets are discarded.

In the flow controlling apparatus, it is possible to prevent a large number of packets from being subsequently discarded for resolution of a congestion in spite that the maximum transmission bandwidth to be actually secured for each class is narrow.

Therefore, a congestion is resolved without undue deterioration in transmission quality.

The principle of a twelfth flow controlling apparatus according to the invention is as follows.

The transmission bandwidth monitoring section 16 recognizes a maximum transmission bandwidth to be secured for the classes respectively corresponding to the queues 12-1 to 12-N. The buffer managing section 14 is given, for each flow, a number which is the maximum of number of new packets allowed to be discarded. The packets are within a range of the recognized transmission bandwidth. The buffer managing section 14 refrains from discarding a new packet, subsequent to new packets of a number greater than or equal to the maximum number, after the number greater than or equal to the maximum number of new packets are discarded.

The flow controlling apparatus makes it possible to prevent an excessively large number of packets from being discarded for resolution of a congestion during a period when the maximum transmission bandwidth to be actually secured for each class is narrow, even in a case where the maximum transmission bandwidth may vary widely.

Therefore, a congestion in the queues 12-1 to 12-N is resolved in a manner flexibly adapted to the degree of relaxation or acceleration of the congestion and the operating statuses of subsequent transmission sections etc. without undue deterioration in transmission quality.

The principle of a thirteenth flow controlling apparatus according to the invention is as follows.

The buffer managing section 14 is given a reference value conforming to transmission bandwidth to be secured for each of possible flows and classes to which a packet to be stored in the queue identified by the queue monitoring section 13, belongs. The buffer managing section 14 refrains from discarding a new packet after a difference or a ratio between a sum of the number or amount of information in packets becomes greater than or equal to the reference value. The packets are previously discarded packets and not discarded packets.

In the flow controlling apparatus, in any of the queues 12-1 to 12-N, the lower the transmission rate to be attained in each flow is, the smaller value the number of discarded packets for resolution of a congestion is set at.

Therefore, a congestion is resolved or identified without many packets belonging to a flow having a low transmission rate improperly discarded.

The principle of a fourteenth flow controlling apparatus according to the invention is as follows.

The buffer managing section 14 discards new packets in each flow at a frequency that is lower in order of time-series.

In this flow controlling apparatus, even when a queue takes a long time to recover from a congestion state, an increase in the number of packets subsequently stored in the queue is prevented.

Therefore, most of packets stored in a queue are read out quickly with high reliability immediately after the queue goes into the congestion state.

The principle of a fifteenth flow controlling apparatus according to the invention is as follows.

The buffer managing section 14 discards new packets at a frequency which is higher, the greater a proportion becomes when a dispersion of the proportion is smaller than a predetermined threshold value. The proportion is the number of discarded packets in each class to the total number of discarded packets in all the classes. The classes respectively correspond to the queues.

In this flow controlling apparatus, when most of packets to be discarded are discarded without being stored in a queue in a congestion state, packets belonging to all the flows temporarily become subjects of discarding while the number of packets to be subsequently discarded for each flow is effectively passed over.

That is, a packet belonging to a particular flow having a lower effective rate than other flows and to be stored in a queue that is in a congestion state, does not occur in a long time.

Therefore, it can be prevented that many new packets are further stored in a congested queue and the congestion is thereby unduly accelerated.

Figure 2:
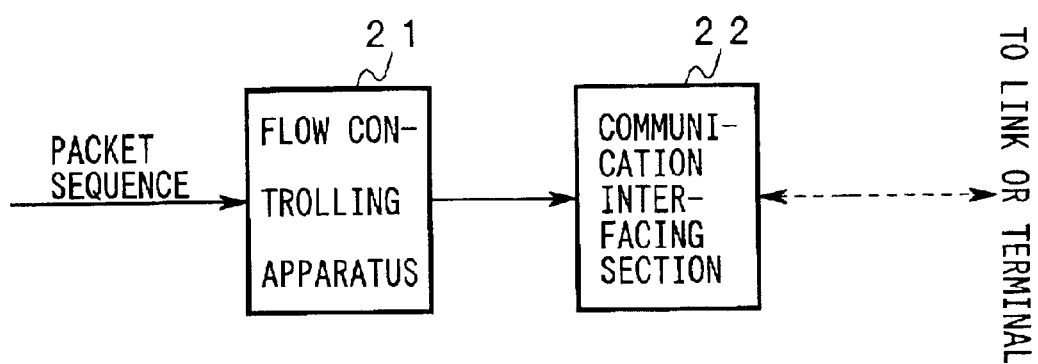
FIG. 2 is a block diagram showing the principles of node apparatuses according to the invention.

FIG. 2 is a block diagram showing the principle of a node apparatus according to the invention. The node apparatus is composed of a flow controlling apparatus 21 and a communication interfacing section 22.

According to the invention recited in claim 1, the flow controlling apparatus 21 performs, in each flow, a rate-based congestion control on a sequence of input packets and buffer management on queues corresponding to respective classes of the packets. The communication interfacing section 22 sends, to a predetermined link or a terminal, packets received under the rate-based congestion control and the buffer management performed by the flow controlling apparatus 21.

In the node apparatus, the transmission quality of each flow is kept uniform and hence the service quality is highly maintained.

Embodiments of the invention will be hereinafter described in detail with reference to the accompanying drawings.

FIG. 3 shows first to eighth embodiments of the invention. The parts in FIG. 3 having the same function and configuration as the corresponding parts in FIG. 9 are given the same reference symbols and will not be described.

These embodiments are mainly different in configuration from the conventional example of FIG. 9 in the following points:

A band monitoring part 31 is provided in place of the band monitoring part 51.

A class identifying part 32 is disposed immediately upstream of the band monitoring part 31.

A queue administering part 33 is provided in place of the congestion controlling part 52.

FIG. 4 is an operation flowchart of the band monitoring part 31 of the first to fifth embodiments. FIG. 5 is an operation flowchart of the queue administering part 33 of the first to fourth embodiments of the invention.

The operation of the first embodiment of the invention will be described below with reference to FIGS. 3–5.

Every time receiving a new packet from an individual terminal, the class identifying part 32 identifies a service class to which the packet belongs by referring to a prescribed field of the packet.

Further, the class identifying part 32 passes, to the band-monitoring part 31, a pair of an identifier (hereinafter referred to as "class identifier") of the service class thus identified and the new packet belonging to the service class.

Figure 6:
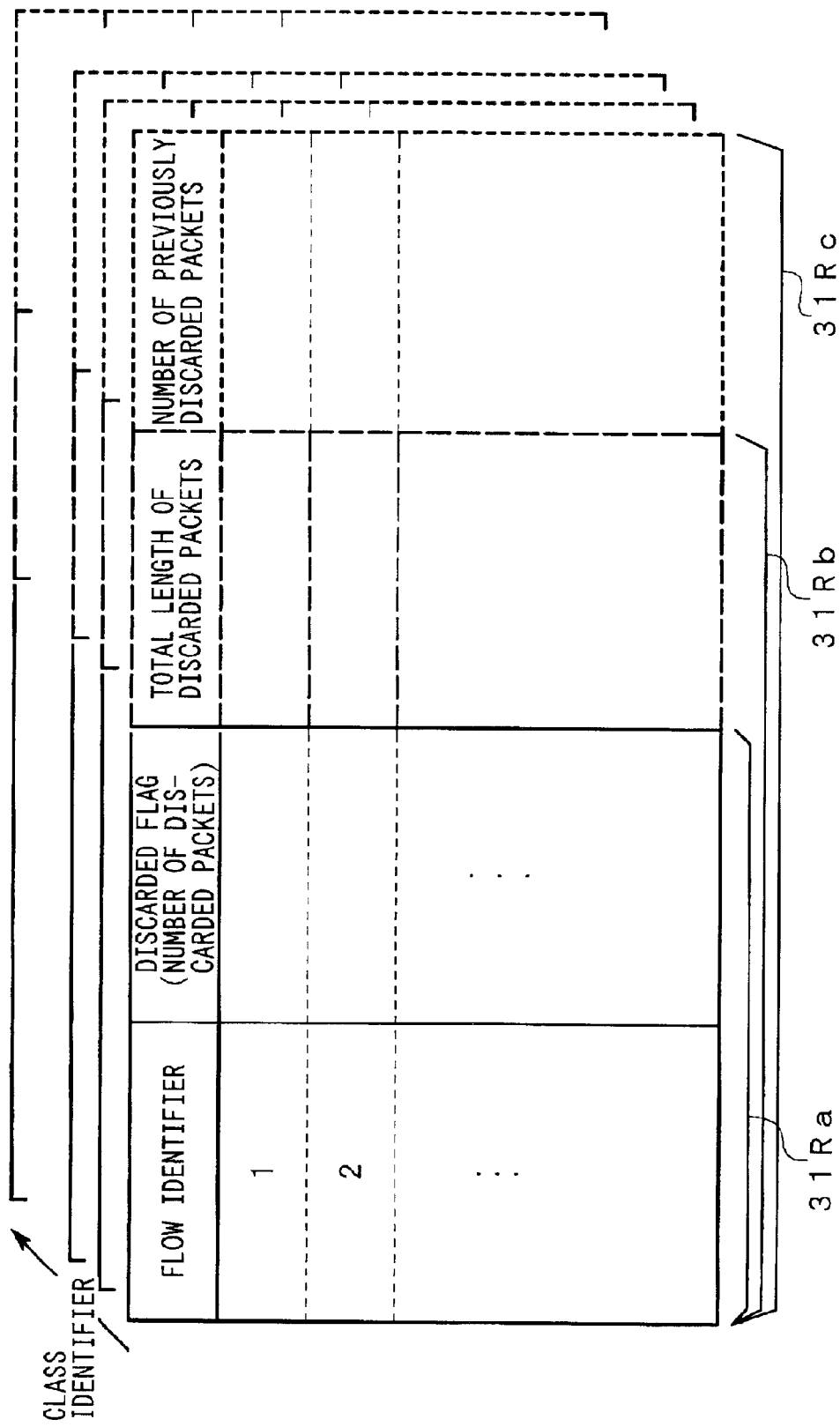
FIG. 6 shows the structure of a discard controlling register.

The band monitoring part 31 has a discard controlling register 31Ra for keeping a discarded flag that corresponds to a class identifier indicating a service class of a new packet and a flow identifier indicating a flow to which the new packet belongs and that indicates whether a packet(s) belonging to the flow was discarded previously (see FIG. 6).

The band monitoring part 31 is informed in advance of contracted bandwidths of the users of the above-mentioned terminals as known information.

Further, every time receiving a pair of a new packet and a class identifier from the class identifying part 32, the band monitoring part 31 performs a rate-based congestion control according to the procedure different than in the conventional example as follows:

Keeps the pair including the new packet and passes the pair to the queue administering part 33 (indicated by symbol (1) in FIG. 4a) when the rate of the new packet included in the pair is lower than the contracted bandwidth.

Discards the pair including the new packet (indicated by symbol (2) in FIG. 4a) when, conversely, the rate of the packet exceeds the contracted bandwidth.

Every time receiving a pair from the band monitoring part 31, the queue administering part 33 performs the following processing:

(1) Identifies a queue (hereinafter referred to as "subject queue") corresponding to the class identifier included in the received pair among the queues 53-1 to 53-3, and judges whether the amount of information (may be a queue length or an average value of queue lengths) of packets stored in the subject queue exceeds an upper limit value THmin (indicated by symbol (1) in FIG. 10) (this step is indicated by symbol (1) in FIG. 5).

(2) Informs the band monitoring part 31 of a judgment result (indicated by symbol (2) in FIG. 5).

(3) Stores the new packet included in the pair in the subject queue according to first-in first-out (indicated by symbol (3) in FIG. 5 and symbol (2) in FIG. 10) when the judgment result is false.

(4) Keeps the pair temporarily (indicated by symbol (4) in FIG. 5) and waits for a flow determining notice to be supplied from the band monitoring part 31 as described later when, conversely, the judgment result is true.

Figure 4B:
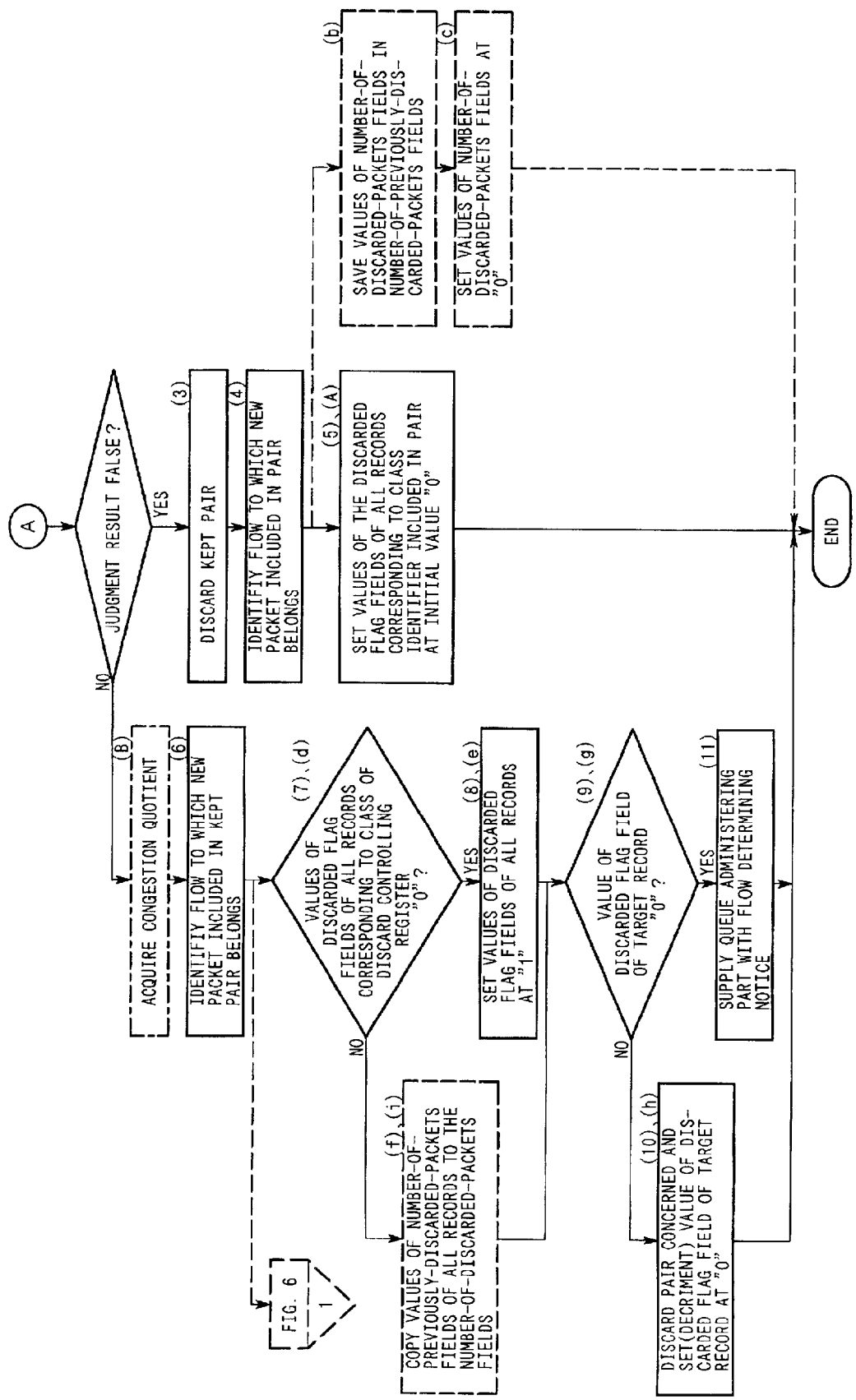
Figure 5:
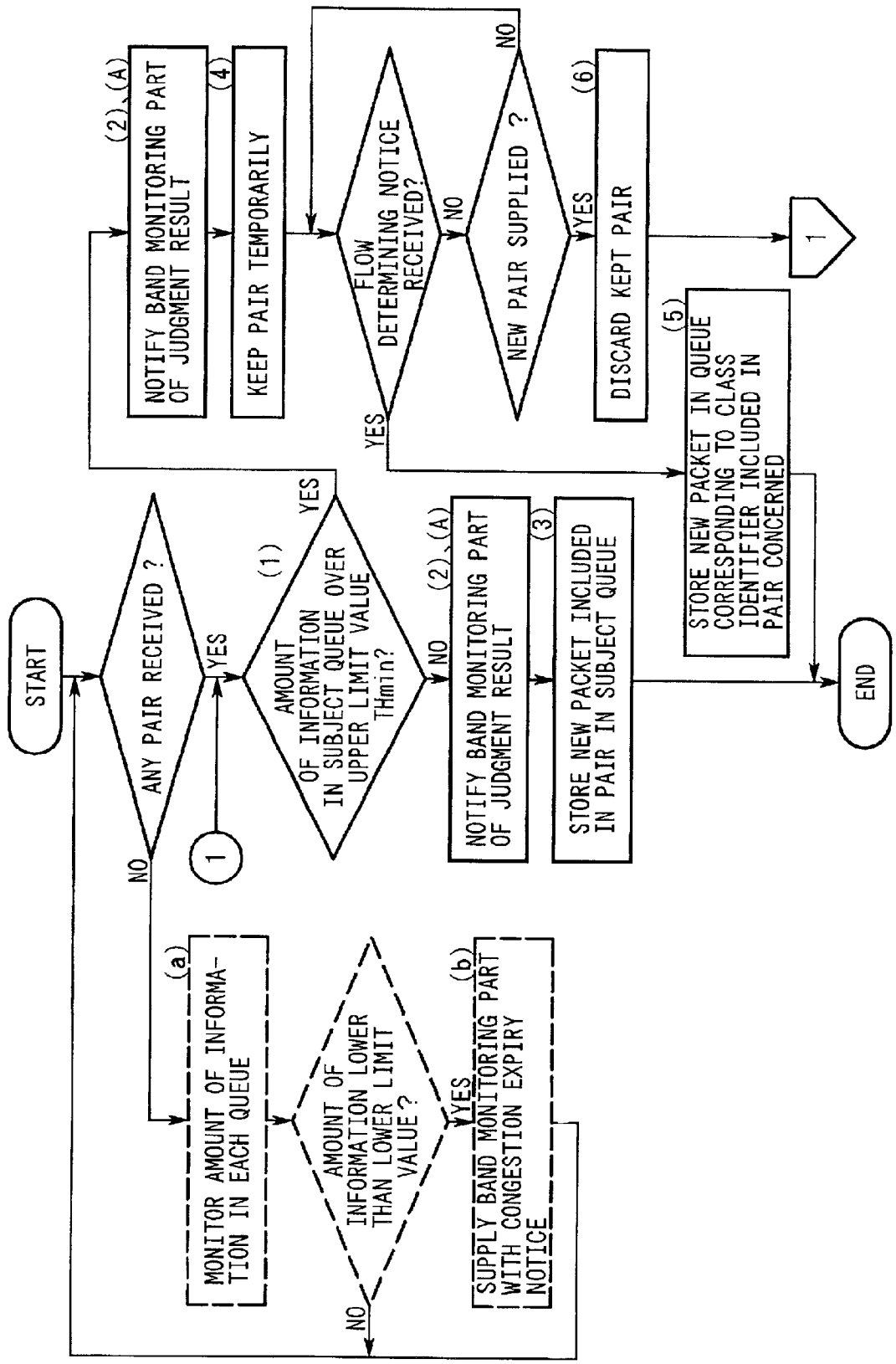
FIG. 5 is an operation flowchart of a queue administering part of the first to fourth embodiments of the invention.

On the other hand, when informed of the above-mentioned judgment result by the queue administering part 33, the band monitoring part 31 performing the following processing:

(1) Performs the following processing (a)–(c) when the judgment result is false:

(a) Discards the pair being held (indicated by symbol (3) in FIG. 4b).

(b) Identifies a flow to which the new packet belongs by referring to a prescribed field of the new packet included in the pair (indicated by symbol (4) in FIG. 4b).

(c) Sets, at an initial value "0," the values of the discarded flag fields of all the records (corresponding to all the flow identifies) corresponding to the class identifier included in the pair among the records of the discard controlling register 31Ra (indicated by symbol (5) in FIG. 4b).

(2) Performs the following processing (a)–(f) when, conversely, the judgment result is true:

(a) Identifies a flow to which the new packet belongs by referring to a prescribed field of the new packet included in the pair being held (indicated by symbol (6) in FIG. 4b).

(b) Judges whether the values of the discarded flag fields of all the records (corresponding to all the flow identifies) corresponding to the class identifier included in the pair among the records of the discard controlling register 31Ra are the initial value "0" (indicated by symbol (7) in FIG. 4b).

(c) Sets the values of the discarded flag fields of all the records at "1" only when the judgment result is true (indicated by symbol (8) in FIG. 4b).

(d) Judges whether the value of the discarded flag field of the record (hereinafter referred to as "target record") corresponding to the flow identifying indicating the above flow and the class identifier concerned among the records of the discard controlling register 31Ra is "0" (indicated by symbol (9) in FIG. 4b).

(e) Discards the pair concerned and sets the value of the discarded flag field of the target record at "0" (indicated by symbol (10) in FIG. 4b) when the judgment result is false.

(f) Supplies the queue administering part 33 with a flow determining notice indicating the judgment result (indicated by symbol (11) in FIG. 4b) when, conversely, the judgment result is true.

Upon receiving the flow determining notice, the queue administering part 33 acquires the new packet and the class identifier that are included in the pair being held and stores the new packet in the queue corresponding to the class identifier among the queues 53-1 to 53-3 (indicated by symbol (5) in FIG. 5).

When supplied with another new pair by the band monitoring part 31 without receiving a flow determining notice, the queue administering part 33 discards the pair being held (indicated by symbol (6) in FIG. 5) and then invokes the above-described process.

That is, even when one or some of the queues 53-1 to 53-3 in which new packets that are sequentially passed to the queue administering part 33 under the rate-based congestion control that is performed by the band monitoring part 31 are to be stored individually are in a congestion state (i.e., packets of an excessive amount of information (number) are stored), the new packets are discarded approximately at the same probability for each of service classes corresponding to those queues with no increased probability given to packets belonging to a particular flow.

As described above, according to this embodiment, in contrast to the conventional example in which packets to be discarded without being stored in a queue that is in a congestion state are determined without identifying a flow to which the packets belong, transmission quality levels attained by respective flows are kept the same.

Therefore, in a node to which this embodiment is applied, occurrence of a deadlock is avoided with higher reliability than in the conventional example and the stability of the flow control and the utilization efficiency of the network are increased.

The second embodiment of the invention will be described below.

This embodiment is mainly different in configuration from the first embodiment in that, as shown in FIG. 6, a discard controlling register 31Rb that is different in structure from the above-described discard controlling register 31Ra in the following points is provided in place of the discard controlling register 31Ra:

Has, for each flow, in place of the discarded flag field, a number-of-discarded-packets field indicating the number of residual new packets that are allowed to be discarded subsequently.

Has, for each flow, a total discard packet length field indicating the sum total of the lengths of packets to be discarded.

FIG. 7 is an operation flowchart of the band monitoring part 31 of the second and fourth embodiments of the invention.

The operation of the second embodiment of the invention will be described below with reference to FIGS. 3–7.

This embodiment is characterized by the following processing that is performed by the band monitoring part 31. The band monitoring part 31 performs the following processing every time it receives a certain pair:

(1) Identifies a flow to which the new packet included in the pair belongs and determines a flow identifier f by referring to a prescribed field of the new packet.

(2) Determines the length of the new packet and records the length over a prescribed time as a time-series history for the identified flow.

The band monitoring part 31 performs the following processing every prescribed unit time:

Determines sum totals Lcf of respective sets of lengths that are recorded as histories in a previous period (over the unit time) and that correspond to all combinations of all class identifiers c that can be included in pairs received from the class identifying part 32 and flow identifiers f indicating flows to which the new packets included in those pairs can belong.

Stores the sum totals of lengths in the total discard packet length fields of the corresponding records of the discard controlling register 31Rb that correspond to all of the above combinations.

Every time receiving a new pair from the class identifying part 32, the band monitoring part 31 performs a rate-based congestion control according to the following procedure:

Keeps the pair including the new packet and passes the pair to the queue administering part 33 (indicated by symbol (1) in FIG. 4a) when the rate of the new packet included in the pair is lower than the contracted bandwidth.

Discards the pair including the new packet (indicated by symbol (2) in FIG. 4a) when, conversely, the rate of the new packet exceeds the contracted bandwidth.

Every time receiving a pair from the band monitoring part 31, the queue administering part 33 performs the following processing:

(1) Identifies a subject queue corresponding to the class identifier included in the received pair among the queues 53-1 to 53-3, and judges whether the amount of information (may be a queue length or an average value of queue lengths) of packets stored in the subject queue exceeds an upper limit value THmin (indicated by symbol (1) in FIG. 5).

(2) Informs the band monitoring part 31 of a judgment result (indicated by symbol (2) in FIG. 5).

(3) Stores the new packet included in the pair in the subject queue according to first-in first-out (indicated by symbol (3) in FIG. 5) when the judgment result is false.

(4) Keeps the pair temporarily (indicated by symbol (4) in FIG. 5) and waits for a flow determining notice to be supplied from the band monitoring part 31 as described later when, conversely, the judgment result is true.

On the other hand, when informed of the above-mentioned judgment result by the queue administering part 33, the band monitoring part 31 performing the following processing:

(1) Performs the following processing (a)–(c) when the judgment result is false:

(a) Discards the pair being held (indicated by symbol (3) in FIG. 4b).

(b) Identifies a flow to which the new packet belongs by referring to a prescribed field of the new packet included in the pair (indicated by symbol (4) in FIG. 4b).

(c) Sets, at an initial value "0," the values of the number-of-discarded-packets fields of all the records (corresponding to all the flow identifies) corresponding to the class identifier c included in the pair among the records of the discard controlling register 31Rb (indicated by symbol (5) in FIG. 4b).

(2) Performs the following processing (a)–(f) when, conversely, the judgment result is true:

(a) Identifies a flow to which the new packet belongs by referring to a prescribed field of the new packet included in the pair being held (indicated by symbol (6) in FIG. 4b).

(b) Judges whether the values of the number-of-discarded-packets fields of all the records (corresponding to all the flow identifies) corresponding to the class identifier c included in the pair among the records of the discard controlling register 31Rb are the initial value "0", (indicated by symbol (1) in FIG. 7).

(c) Sets the values of the number-of-discarded-packets fields of all the records at initial values Ncf described below (indicated by symbol (2) in FIG. 7) only when the judgment result is true.

Each initial value Ncf is an integer that is greater than or equal to the proportion of the value of the number-of-discarded-packets field of each record corresponding to the class identifier c among the records of the discard controlling register 31Rb to the sum total of the values of the number-of-discarded-packets fields of all the records corresponding to the class identifier c, or an integer that is larger when the proportion is larger.

(d) Judges whether the value of the number-of-discarded-packets field of the record (hereinafter referred to as "target record") corresponding to the flow identifier indicating the above flow and the class identifier concerned among the records of the discard controlling register 31Rb is "0" (indicated by symbol (3) in FIG. 7).

(e) Discards the pair concerned and decrements the value of the number-of-discarded-packets field of the target record (indicated by symbol (4) in FIG. 7) when the judgment result is false.

(f) Supplies the queue administering part 33 with a flow determining notice indicating the judgment result (indicated by symbol (5) in FIG. 7) when, conversely, the judgment result is true.

Upon receiving the flow determining notice, the queue administering part 33 acquires the new packet and the class identifier that are included in the pair being held and stores the new packet in the queue corresponding to the class identifier among the queues 53-1 to 53-3 (indicated by symbol (5) in FIG. 5).

When supplied with another new pair by the band monitoring part 31 without receiving a flow determining notice, the queue administering part 33 discards the pair being held (indicated by symbol (6) in FIG. 5) and then activates the above-described process.

That is, even when the queues 53-1 to 53-3 in which new packets sequentially passed to the queue administering part 33 under the rate-based congestion control that is performed by the band monitoring part 31 are to be stored individually is in a congestion state (i.e., packets of an excessive amount of information (number) are stored), the new packets are discarded at a constant frequency irrespective of the rates of respective flows to which the new packets belong.

Therefore, according to this embodiment, in contrast to the case where packets to be discarded without being stored in a queue that is in a congestion state are determined irrespective of the rates of respective flows to which the packets belong, transmission quality levels attained by the respective flows are kept approximately uniform.

The third embodiment of the invention will be described below.

This embodiment is mainly different in configuration from the second embodiment in that, as shown in FIG. 6, a discard controlling register 31Rc that is different from the discard controlling register 31Rb in having an advance-number-of-discarded-packets field where to save the value of the number-of-discarded-packets field for each record is provided in place of the discard controlling register 31Rb.

The operation of the third embodiment of the invention will be described below with reference to FIGS. 3–6.

This embodiment is mainly different from the second embodiment in the procedure of the following processing that is performed by the band monitoring part 31 and the queue administering part 31.

The queue administering part 33 monitors individually the amount of information in packets stored in the respective queues 53-1 to 53-3 (indicated by symbol (a) in FIG. 5), and supplies the band monitoring part 31 with a congestion expiry notice including the identifier of a queue (indicated by symbol (b) in FIG. 5) when its amount of information comes lower than a prescribed lower limit value.

On the other hand, the band monitoring part 31 performs processing the procedure of which is different than in the second embodiment in the following points.

Upon receiving a congestion expiry notice including the identifier (for simplicity, it is assumed here to be the same as a class identifier c) of one of the queues 53-1 to 53-3 from the queue administering part 33, the band monitoring part 31 saves the values of the number-of-discarded-packets fields of all the records, corresponding to the class identifier c included in the congestion expiry notice among the records of the discard controlling register 31Rc, in the number-of-previously-discarded-packets field (indicated by symbol (a) in FIG. 4a).

The procedure of processing (indicated by symbols (1) and (2) in FIG. 4a) that is performed by the band monitoring part 31 to pass a certain new pair to the queue administering part 33 is the same as in the second embodiment, and hence will not be described.

When informed of the above-mentioned judgment result by the queue administering part 33, the band monitoring part 31 performs the following processing:

(1) Performs the following processing (a)–(c) when the judgment result is false:
   (a) Discards the pair being held (indicated by symbol (3) in FIG. 4b).
   (b) Identifies a flow to which the new packet belongs by referring to a prescribed field of the new packet included in the pair (indicated by symbol (4) in FIG. 4b).
   (c) Performs the following processing on all the records (corresponding to all the flow identifies) corresponding to the class identifier c included in the pair among the records of the discard controlling register 31Rc:
   Saves the values of the number-of-discarded-packets fields in the number-of-previously-discarded-packets field (indicated by symbol (b) in FIG. 4b).
   Sets the values of the number-of-discarded-packets fields at an initial value "0", (indicated by symbol (c) in FIG. 4b).

(2) Performs the following processing (a)–(g) when, conversely, the judgment result is true:
   (a) Identifies a flow to which the new packet belongs by referring to a prescribed field of the new packet included in the pair being held (indicated by symbol (6) in FIG. 4b).
   (b) Judges whether the values of the number-of-previously-discarded-packets field of all the records (corresponding to all the flow identifies) corresponding to the class identifier c included in the pair among the records of the discard controlling register 31Rb are the initial value "0" (indicated by symbol (d) in FIG. 4b).
   (c) Sets the values of the number-of-discarded-packets fields of all the records at initial values Ncf (described above) (indicated by symbol (e) in FIG. 4b) when the judgment result is true.
   (d) Copies the values of the number-of-previously-discarded-packets field of all the records to the number-of-discarded-packets fields (indicated by symbol (f) in FIG. 4b) when, conversely, the judgment result is false.
   (e) Judges whether the value of the number-of-discarded-packets field of the target record corresponding to the flow identifier indicating the above flow and the class identifier concerned among the records of the discard controlling register 31Rc is "0" (indicated by symbol (g) in FIG. 4b).
   (f) Discards the pair concerned and decrements the value of the number-of-discarded-packets field of the target record (indicated by symbol (h) in FIG. 4b) when the judgment result is false.
   (g) Supplies the queue administering part 33 with a flow determining notice indicating the judgment result (indicated by symbol (11) in FIG. 4b) when, conversely, the judgment result is true.

The procedure of processing that is performed by the queue administering part 33 in response to such a flow determining notice is the same as in the second embodiment, and hence will not be described.

That is, the number of residual packets that are stored in a queue in a congestion state among the queues 53-1 to 53-3 and are to be discarded to dissolve the congestion state is taken over reliably as the number of packets to be discarded in a subsequent congestion state even after elimination of the congestion state.

Therefore, even where one of the queues 53-1 to 53-3 is in a congestion state intermittently, the frequency at which packets belonging to each flow should be discarded is kept proper with high accuracy.

In this embodiment, the values of the number-of-discarded-packets fields of none of the records of the discard controlling register 31Rc are decremented unless new packets belonging to a corresponding service class and flow are discarded.

However, weighting may be performed on each discard packet field in such a manner that the weight is lower as time elapses from a time point of updating of the value. This is to prevent undue delay of recognition of a time point when a congestion state has been eliminated because of a phenomenon that discard of packets belonging to a flow whose rate is much lower than most of flows of a service class concerned, delays to a large extent in spite that a desired number of packets belonging to those flows have been discarded.

The fourth embodiment of the invention will be described below.

The hardware configuration of this embodiment is basically the same as that of the second embodiment and hence will not be described.

The operation of the fourth embodiment of the invention will be described with reference to FIGS. 3–7.

This embodiment is different from the second embodiment in the following processing that is performed by the band monitoring part 31 and the queue administering part 33 in cooperation.

Every time receiving a certain pair from the band monitoring part 31, the queue administering part 33 identifies a subject queue corresponding to the class identifier included in the received pair among the queues 53-1 to 53-3, and judges whether the amount of information in packets stored in the subject queue exceeds a prescribed upper limit value THmin (indicated by symbol (1) in FIG. 5).

Further, when the judgment result is false, the queue administering part 33 adds, to a judgment result to be notified to the band monitoring part 31, a proportion (or a difference; hereinafter referred to as "congestion quotient") between the amount of information in the packets actually stored in the subject queue and the upper limit value THmin (indicated by symbol (A) in FIG. 5).

On the other hand, when informed of the above-mentioned judgment result by the queue administering part 33, the band monitoring part 31 performing the following processing:

(1) When the judgment result is false, discards the pair being held and sets, at an initial value "0," the values of the number-of-discarded-packets fields of all the records corresponding to the class identifier c included in the pair among the records of the discard controlling register 31Rb (indicated by symbols (3), (4), and (A) in FIG. 4b) according to the same procedure as in the second embodiment.

(2) Performs the following processing (a)–(e) when, conversely, the judgment result is true:

(a) Acquires the congestion quotient included in the judgment result (indicated by symbol (B) in FIG. 4b).

(b) Identifies a flow to which the new packet belongs by referring to a prescribed field of the new packet included in the pair being held (indicated by symbol (6) in FIG. 4b).

(c) Judges whether the values of the number-of-discarded-packets fields of all the records corresponding to the class identifier c included in the pair among the records of the discard controlling register 31Rb are the initial value "0" (indicated by symbol (1) in FIG. 7).

(d) Sets the values of the number-of-discarded-packets fields of all the records at the products of initial values Ncf (described above) and the congestion quotient (indicated by symbol (A) in FIG. 7) only when the judgment result is true.

(e) Subsequently, continues the processing according to the same procedure as in the second embodiment (will not be described in detail).

The procedure of processing that is performed by the queue administering part 33 in response to a flow determining notice that is supplied from the band monitoring part 31 during the course of the above processing is the same as in the second embodiment, and hence will not be described.

That is, in a congestion state in which packets of an excessive amount of information (number) are stored in one of the queues 53-1 to 53-3 in which new packets that are sequentially passed to the queue administering part 33 under the rate-based congestion control by the band monitoring part 31 should be stored individually, the new packets are discarded at a frequency proportional to the degree of excess of the amount of information (the above-mentioned congestion quotient) irrespective of the rates of respective flows to which the new packets belong.

Therefore, according to this embodiment, in contrast to the second embodiment in which a frequency at which to discard packets to dissolve a congestion is determined for each flow regardless of the degree of the congestion though some of the queues 53-1 to 53-3 may be in a congestion state simultaneously, the congestion can be dissolved efficiently and quickly.

No suitable values or ranges of the congestion quotient are disclosed in this embodiment. However, the congestion quotient may have either values capable of realizing a flow control of a desired form or not imposing any limitations on such a flow control or predetermined discrete values.

The fifth embodiment of the invention will be described below.

The hardware configuration of this embodiment is basically the same as that of the third embodiment and hence will not be described.

The operation of the fifth embodiment of the invention will be described with reference to FIGS. 3 and 4.

This embodiment is mainly different from the third embodiment in the following processing that is performed by the band monitoring part 31.

When receiving a congestion expiry notice including the identifier (for simplicity, it is assumed here to be the same as a class identifier c) of one of the queues 53-1 to 53-3 from the queue administering part 33, the band monitoring part 31 saves the values of the number-of-discarded-packets fields of all the records corresponding to the class identifier c among the records of the discard controlling register 31Rc in the number-of-previously-discarded-packets field (indicated by symbol (a) in FIG. 4a).

The procedure of processing that is performed by the band monitoring part 31 to pass a certain new pair to the queue administering part 33 is the same as in the second embodiment, and hence will not be described.

When informed of the above-mentioned judgment result by the queue administering part 33, the band monitoring part 31 performs the following processing:

(1) When the judgment result is false, discards the pair being held according to the same procedure as in the third embodiment and performs the following processing on all the records corresponding to the class identifier c included in the pair among the records of the discard controlling register 31Rc:

Saves the values of the number-of-discarded-packets fields in the number-of-previously-discarded-packets field.

Sets the values of the number-of-discarded-packets fields at an initial value "0" (indicated by symbols (3), (4), and (A) in FIG. 4b).

(2) Performs the following processing (a)–(e) when, conversely, the judgment result is true:

(a) Identifies a flow to which the new packet belongs by referring to a prescribed field of the new packet included in the pair being held (indicated by symbol (6) in FIG. 4b).

(b) Judges whether the values of the number-of-previously-discarded-packets field of all the records (corresponding to all the flow identifies) corresponding to the class identifier c included in the pair among the records of the discard controlling register 31Rc are the initial value "0" (indicated by symbol (d) in FIG. 4b).

(c) Sets the values of the number-of-discarded-packets fields of all the records at the initial values Ncf (described above) irrespective of the judgment result (indicated by symbol (e) in FIG. 4b).

(d) Adds the values of the number-of-previously-discarded-packets field to the values of the number-of-discarded-packets fields of all the records (indicated by symbol (i) in FIG. 4b) when the judgment result is false.

(e) Subsequently, continues the processing according to the same procedure as in the third embodiment.

The procedure of processing that is performed by the queue administering part 33 in response to a flow determining notice that is supplied from the band monitoring part 31 during the course of the above processing is the same as in the third embodiment, and hence will not be described.

That is, the number of residual packets of each flow to be discarded without being stored in a queue that is in a congestion state is taken over reliably in such a manner as to be added to the number of packets to be discarded originally in a subsequent congestion state even after elimination of the congestion state.

Therefore, even where one of the queues 53-1 to 53-3 is in a congestion state intermittently, the frequency at which packets belonging to each flow should be discarded is kept proper with higher accuracy than in the third embodiment.

The third and fifth embodiments are improvements to the second and third embodiments, respectively. However, the first embodiment may be improved in the same manners as described in the third and fifth embodiments.

The sixth embodiment of the invention will be described below.

The configuration of this embodiment is basically the same as that of the second embodiment and hence will not be described.

The operation of the sixth embodiment of the invention will be described with reference to FIGS. 3 and 6.

This embodiment is characterized by the following processing that is performed by the band monitoring part 31.

The band monitoring part 31 determines maximum transmission rates (transmission bandwidths; hereinafter referred to as "maximum available rates") that can be realized by packets of the respective service classes corresponding to the queues 53-1 to 53-3 by taking into account all or part of the following items:

The sizes of the queues 53-1 to 53-3.

A switch to which packets read out from the queues 53-1 to 53-3 are given or sent and the statuses of downstream transmission sections (including the degrees of congestion and occurrence/non-occurrence of a failure).

It is assumed that the above-mentioned maximum available rate is given as a proportion with respect to a prescribed standard transmission rate that is common to all the service classes.

The procedure of processing to be performed to recognize the statuses of the above transmission sections is not an important feature of the invention and can be realized by using various known techniques, and hence will not be described.

The band monitoring part 31 determines the sum total Lcf of lengths per unit time for each flow of packets included in pairs that are supplied from the class identifying part 32 according to the same procedure as in the second embodiment. Further, the band monitoring part 31 stores the products of the sum totals LCf of lengths and the proportions that were determined above as the maximum available rates in the total discard packet length fields of the records of the discard controlling register instead of the sum totals Lcf.

That is, when one of the queues 53-1 to 53-3 is in a congestion state, new packets that are sequentially passed to the queue administering part 33 under the rate-based congestion control by the band monitoring part 31 are discarded at a frequency that is higher when the rate of each flow is higher and that is lower when the maximum available rate that can be secured actually for a service class corresponding to a queue concerned is lower.

As described above, this embodiment can prevent an event that the number of packets that should be discarded to dissolve a congestion state occurring in one of the queues 53-1 to 53-3 becomes unduly large in spite of a state that the maximum available rate that can be secured actually for each service class is low.

Therefore, a congestion state occurring in any of the queues 53-1 to 53-3 can be dissolved without deteriorating the transmission quality unduly.

The seventh embodiment of the invention will be described below.

The configuration of this embodiment is basically the same as that of the sixth embodiment and hence will not be described.

The operation of the seventh embodiment of the invention will be described with reference to FIG. 3.

This embodiment is different from the second embodiment in the following processing that is performed by the band monitoring part 31.

The band monitoring part 31 determines maximum transmission rates (transmission bandwidths; hereinafter referred to as "maximum available rates") that can be realized by packets of the respective service classes corresponding to the queues 53-1 to 53-3 according to the same procedure as in the sixth embodiment.

In this embodiment, it is assumed that the maximum available rate is given as the number of packets that should be transmitted in a unit time.

Further, the band monitoring part 31 determines a standard value of the difference or proportion for each flow between the number of packets that should be discarded to dissolve a congestion state occurring in the queues 53-1 to 53-3 (this number is given as a value of an increasing function of the maximum available rate determined above for each service class) and the number of packets that are not subjects of such discard.

The standard value may be determined by proportionally dividing a value commensurate with the maximum available rate for each service class according to transmission bandwidths of respective flows. The transmission bandwidths of respective flows may be determined by actual measurements or given in advance as constants.

In performing processing of determining new packets that should be discarded to dissolve a congestion state of one of the queues 53-1 to 53-3 (the procedure of this processing is the same as in the second embodiment except for the following points and hence will not be described), the band monitoring part 31 performs the following processing:

(a) Every time new packets to be discarded are determined, counts the number Dcf of such packets for each combination of a service class (class identifier c) and a flow (flow identifier f) of the packets.

(b) Conversely, every time new packets that are not subjects of discarding are determined, counts the number dcf of such packets for each combination of a service class (class identifier c) and a flow (flow identifier f) of the packets.

When the above-mentioned judgment result that is notified by the queue administering part 33 is true, the band monitoring part 31 performs processing according to the same procedure as in the second embodiment except for the following points:

(1) When the value of the number-of-discarded-packets field of a target record corresponding to a class identifier and a flow identifier indicating a flow that was identified in advance among the records of the discard controlling register 31Rb is not equal to "0," judges whether the value j (hereinafter referred to as "determinant value") of one of the following determinants involving the above-mentioned numbers Dcf and dcf of packets is greater than or equal to the above-mentioned standard value:

$j=Dcf/dcf$ $j=dcf-Dcf.$ (2) When the judgment result is true, refrains from discarding the pairs concerned and decrementing the value of the number-of-discarded-packets field of the target record.

Therefore, according to this embodiment, the discard of new packets that should be performed to dissolve a congestion state of the queues 53-1 to 53-3 is stopped earlier when the maximum available rate of the flow to which the new packets belong is lower.

In this embodiment and the above-described sixth embodiment, a maximum available rate that can be secured actually for the service class corresponding to a queue that is in a congestion state among the queues 53-1 to 53-3 is monitored under a prescribed communication control.

However, such a maximum available rate may be given in advance as such information as office data in, for example, a case where one or both of the sizes of the queues 53-1 to 53-3 and transmission rates to be attained for respective flows by packets of a service class corresponding to each of the queues 53-1 to 53-3 are given accurately in advance and a decrease that may occur due to a failure in the above-mentioned transmission sections is given as a proper margin.

In this embodiment and the above-described sixth embodiment, the frequencies for respective flows at which packets should be discarded to dissolve a congestion state occurring in the queues 53-1 to 53-3 are kept constant.

However, the invention is not limited to such a configuration. For example, an environment may be secured in which increase in the number of packets that are stored in a queue concerned is restricted positively by setting the frequency of discard of packets at smaller values stepwise when one or both of the following for each flow are longer or larger, whereby most of excess packets stored in the queue are read out quickly:

An elapsed time from a time point when the queue concerned is in a congestion state.

The number of packets that were discarded in advance.

The eighth embodiment of the invention will be described below.

The hardware configuration of this embodiment is basically the same as that of the second embodiment and hence will not be described.

The operation of the eighth embodiment of the invention will be described with reference to FIG. 3.

The band monitoring part 31 determines maximum available rates, standard values, the numbers Dfc of packets to be discarded, and the numbers dcf of packets that are not subjects of discarding according to the same procedure as in the seventh embodiment.

Further, the band monitoring part 31 performs the following processing in a period when a congestion state of one of the queues 53-1 to 53-3 continues:

(1) Computes the sum total $\Sigma D$ of the numbers Dcf of packets and the sum total $\Sigma d$ of the numbers dcf of packets that are not subjects of discarding for all combinations of the class identifier c concerned and the flow identifiers f of flows to which packets associated with the class identifier c can belong, and computes a determinant value J according to the following equation:

$J=\Sigma D/(\Sigma D+\Sigma d).$ (2) Judges whether the determinant value j is smaller than a prescribed lower limit value.

(3) Performs the following processing (a) or (b) only when the judgment result is true:

(a) Updates the numbers Dcf of packets and the numbers dcf of packets corresponding to all the flows, respectively, according to the following equations for the service class concerned:

Dcf=-Dcf dcf=0.

(b) Performs the following processing in addition to the above processing (a).

For the numbers Dcf of packets corresponding to the flows for which the value of the determinant value J is smaller than the prescribed value, updates the numbers Dcf according to the following equation where $\alpha$ is a positive number that is given in advance or computed as a value suitable for the flow control method:

$Dcf=-Dcf-\alpha.$

That is, when most of packets that should be discarded without being stored in a queue in a congestion state have been discarded, packets belonging to all the flows are made subjects of discarding while the numbers of residual packets to be discarded subsequently of the respective flows are passed over effectively.

As described above, this embodiment prevents an event that many new packets are further stored in a queue that was once in a congestion state and as a result the congestion state continues unduly or another congestion state occurs even when a packet that belongs to a particular flow having a lower effective rate than other flows and that should be stored in the queue concerned does not occur for a long time.

In this embodiment, the determinant value J is computed based on the sum total $\Sigma D$ of the numbers of packets to be discarded and the sum total $\Sigma d$ of the numbers of packets that are not subjects of discarding irrespective of the flow.

However, the invention is not limited to such a configuration. For example, a statistical dispersion of proportions (=Dcf/(Dcf+dcf)) corresponding to the respective flows may be used instead of the determinant value J as long as it is recognized with desired accuracy that all the packets belonging to most of the flows among the packets that should be discarded without being stored in the queue in a congestion state have been discarded.

In each of the above embodiments, the band monitoring part 31 performs the processing of selecting packets that should be discarded without being stored in a queue that is in a congestion state among the queues 53-1 to 53-3.

However, all or part of the above processing may be performed by the queue administering part 33 or a component that is separate from the queue administering part 33 and the band monitoring part 31 when a service class of new packets that can be subjects of discarding and a flow to which those packets belong are identified reliably.

The invention is not limited to the above embodiments and various modifications may be made without departing from the spirit and the scope of the invention. Any improvement may be made in part or all of the components.

What is claimed is:

1. A flow controlling apparatus comprising:
a rate-based congestion controlling section for adjusting a rate of a sequence of input packets to a value lower than or equal to a prescribed upper limit value for every flow where the input packets individually belong;
queues provided corresponding to classes to which said input packets can belong, for storing and sending said input packets according to first-in first-out;

a queue monitoring section for identifying, from said queues, a queue wherein an amount of information in a stored packet exceeds a prescribed threshold value; and a buffer managing section for discarding new packets at a predetermined frequency in every flow to which the new packets belong, said new packet whose rate is adjusted by said rate-based congestion controlling section and being to be stored in said identified queue.

2. The flow controlling apparatus according to claim 1, wherein said buffer managing section for identifying a flow to which an input packet belongs comprises
a section which is integral with/provided in said rate-based congestion controlling section.

3. The flow controlling apparatus according to claim 1, further comprising a rate monitoring section for monitoring said rate of said sequence for every flow, and wherein said buffer managing section stores said rate-adjusted packet at a frequency in one of said queues corresponding to classes of said rate-adjusted packet, the frequency being an equivalent of a proportion of said monitored rate in each class to a total of said monitored rates in all the classes, or an equivalent of a proportion as an increasing function of the proportion of said monitored rate in each class.

4. The flow controlling apparatus according to claim 2, further comprising a rate monitoring section for monitoring said rate of said sequence for every flow, and wherein said buffer managing section stores said rate-adjusted packet at a frequency in one of said queues corresponding to classes of said rate-adjusted packet, the frequency being an equivalent of a proportion of said monitored rate in each class to a total of said monitored rates in all the classes, or an equivalent of a proportion as an increasing function of the proportion of said monitored rate in each class.

5. The flow controlling apparatus according to claim 1, wherein said buffer managing section records a past result of packet discard for every flow, and performs one of:

excluding a new packet of a flow having said past result from being a subject of discarding; and discarding said new packet at a lower frequency than a frequency at which new packets of a flow not having said past result are to be discarded.

6. The flow controlling apparatus according to claim 1, wherein said buffer managing section counts the number of times packet(s) is/are discarded for every flow, and performs one of:

excluding, from a subject of discarding, a new packet of a flow where packet(s) is/are discarded a number of times greater than or equal to a prescribed value; and discarding said new packet at a lower frequency than a frequency at which new packets of a flow where packet(s) is/are discarded a number of times smaller than said prescribed value, are to be discarded.

7. The flow controlling apparatus according to claim 5, wherein said buffer managing section keeps a past result of packet discard for every flow to which the discarded packets belong, and performs one of:

excluding, from a subject of discarding, a packet which belongs to a flow whose past result is kept and which is to be stored in said queue identified by said queue monitoring section; and discarding said packet to be stored at a lower frequency than a frequency at which new packets of a flow not having said past result are to be discarded.

8. The flow controlling apparatus according to claim 6, wherein said buffer managing section keeps the number of times packet(s) is/are discarded for every flow, and performs one of:

excluding, from a subject of discarding, a packet which belongs to a flow where packet(s) is/are discarded a number of times greater than a predetermined value and is to be stored in said identified queue; and discarding said packet to be stored at a lower frequency than a frequency at which packets belonging to a flow where packet(s) is/are discarded a number of times smaller than said predetermined value, are to be discarded.

9. The flow controlling apparatus according to claim 6, wherein said buffer managing section keeps a number of times packet(s) is/are discarded, whose importance of the kept data is weighed lighter as time elapses, the number being kept corresponding to a flow to which said packet belongs, and performs one of:

excluding, from a subject of discarding, a packet of a flow whose number of times packet(s) is/are discarded is kept, and is to be stored in said identified queue; and discarding said packet to be stored at a frequency which is lower, the smaller said number of times said packet is discarded becomes.

10. The flow controlling apparatus according to claim 1, wherein:

said queue monitoring section identifies a degree in which said amount of information in packets stored in said queues exceeds said prescribed threshold value; and said buffer managing section discards new packets to be stored in said queue at a frequency which is higher, the higher said identified degree is.

11. The flow controlling apparatus according to claim 1, wherein said buffer managing section:

is given in advance a maximum value conforming to said classes respectively corresponding to said queues; and discards new packets of said classes at a frequency lower than or equal to said maximum value.

12. The flow controlling apparatus according to claim 1, wherein said buffer managing section:

is given in advance, for every flow, a number, which is the maximum of the number of new packets allowed to be discarded, the packets being in a range of transmission bandwidth to be secured; and refrains from discarding a new packet, subsequent to new packets of a maximum number, after said maximum number of new packets are discarded.

13. The flow controlling apparatus according to claim 1, further comprising a transmission bandwidth monitoring section for recognizing a maximum transmission bandwidth to be secured for each of said classes respectively corresponding to said queues, and wherein said buffer managing section:

is given in advance, for every flow, a number, which is the maximum of the number of new packets allowed to be discarded, the packets being in a range of transmission bandwidth to be recognized by said transmission bandwidth monitoring section; and refrains from discarding a new packet, subsequent to new packets of a number greater than or equal to the maximum number, after the number greater than or equal to said maximum number of new packets are discarded.

14. The flow controlling apparatus according to claim 1, wherein said buffer managing section:

is given a reference value conforming to a transmission bandwidth to be secured for each of possible flows and classes to which a packet to be stored in said queue identified by said queue monitoring section belongs; and refrains from discarding a new packet, subsequent to new packets having a difference and a ratio greater than or equal to said reference value, after the difference or the ratio between a sum of the numbers or amount of information in packets becomes greater than or equal to said reference value, said packets being previously discarded packets and not discarded packets.

15. The flow controlling apparatus according to claim 1, wherein said buffer managing section discards said new packet in every flow at a frequency that is lower in order of time-series.

16. The flow controlling apparatus according to claim 1, wherein said buffer managing section discards new packets at a frequency which is higher, the greater a proportion becomes when a dispersion of the proportion is smaller than a predetermined threshold value, the proportion being the number of discarded packets in each class to the total number of discarded packets in all the classes.

17. A node apparatus comprising:

a flow controlling apparatus comprising a rate-based congestion controlling section for adjusting a rate of a sequence of input packets to a value lower than or equal to a prescribed upper limit value for every flow where the packets individually belong, queues provided corresponding to classes to which said input packets can belong, for storing and sending said packets according to first-in first-out, a queue monitoring section for identifying, from said queues, a queue wherein an amount of information in stored packets exceeds a prescribed threshold value, and a buffer managing section for discarding new packets at a predetermined frequency in every flow to which the new packets belong, said new packets whose rate is adjusted by said rate-based congestion controlling section and being to be stored in said identified queue; and communication interfacing section for sending a packet stored in said queue, to a predetermined link or terminal.

* * * * *